Patented Dec. 5, 1933

1,938,513

UNITED STATES PATENT OFFICE 1,938,513

PROCESS FOR WORKING UP NAPHTHENIC ACID SOAP-CONTAINING OILY RESIDUES

Richard Brunck, Berlin-Charlottenburg, Alfred Kreutzer and Walther Boeck, Emmerich-on-the-Rhine, Germany, assignors to the firm Deutsche Gasolin Aktiengesellschaft, Berlin-Charlottenburg, Germany No Drawing. Application January 16, 1931, Serial No. 509,268, and in Germany January 23, 1930

6 Claims. (Cl. 196—38)

When mineral oils which contain natural acids, such as naphthene acids, are being worked up, these acids must be removed first of all so as to avoid the formation of emulsions during the working up process. Consequently, such mineral oils are first of all distilled in presence of alkaline substances, such as caustic soda, caustic potash, or lime, whereupon the acid constituents remain behind in the form of soaps, the decomposition temperature of which must, of course, not be exceeded.

The residue from the distillation is a dark-coloured product. Besides the alkali or alkaline earth soap, it contains asphalt-like polymerization products formed in each distillation. Such residues hitherto were valueless or at least were only of a very small value.

It has now been found that the soaps contained in the said distillation residues may be decomposed forthwith into free acid and alkali sulphate or alkaline earth sulphate by addition of concentrated sulphuric acid. This action was not to be expected. It had been assumed that sulphuric acid only acts on the soaps when the latter are present in an aqueous medium, that is to say are in a hydrolyzed and ionized condition. The soaps, however, are not present in an ionized state in the residues under consideration in the present case. The prosecution of the process is very simple. If, prior to adding the concentrated sulphuric acid, dilution is effected with hydrocarbon liquids, the free acid which is separated out dissolves in the added hydrocarbons. The asphalt-like polymerization products form the known "acid-resins" during the treatment with sulphuric acid. The mixture of "acid-resin" and sulphate readily settles on standing and may be mechanically separated without difficulty from the supernatant liquid, which in some cases is diluted by the added hydrocarbon.

The further working up of the product separated from the "acid-resins" and the sulphate is then effected in the usual manner, either to a mineral-like product of high naphthene acid content suitable for special purposes, or to a refined mineral oil if the liberated acid is taken up into solution by means of aqueous alkali and the purified mineral oil is distilled.

Example 1.—A residue containing lime which is formed on distilling in presence of solid caustic potash mineral oil distillate containing naphthene acid obtained from Venezuelian oil is mixed, while being stirred, with 4% concentrated (98%) sulphuric acid at ordinary temperature. The "acid-resin"-like products which form are mechanically separated. The oily material remaining behind is obtained as a mineral oil-like product of high naphthene acid content by filtration over fuller's earth.

Example 2.—An oil obtained from crude Venezuelian oil by distillation is distilled again in presence of caustic soda. The residue, after dilution with gas oil or some other low boiling hydrocarbon, is stirred with 4% of concentrated (98%) sulphuric acid. After separation of the "acid-resin" the oil is purified in the usual manner with aqueous lye. The naphthenic acids taken up may be obtained from the lye in ordinary commercial quality by acidification with dilute mineral acid, whilst the mineral oil freed from naphthene acid is obtained as a pure refined mineral oil by subsequent removal of the added gas oil by distillation.

What we claim is:

1. A process for working up the naphthenic acid soap-containing oily residues obtained in the distillation of acid-containing mineral oils over alkalies or alkaline earths consisting in treating said residues in the water-free state with concentrated sulphuric acid, whereby the naphthenic acids removed from the oil by the said alkali or alkaline earth are liberated.

2. A process for working up the naphthenic acid soap-containing oily residues obtained in the distillation of acid-containing mineral oils over alkalies or alkaline earths consisting in adding to the said residues in the water-free state a hydrocarbon liquid and then adding concentrated sulphuric acid to the mixture, whereby the naphthenic acids removed from the oil by the said alkali or alkaline earth are liberated and enter into solution in the hydrocarbon liquid.

3. A process for working up the naphthenic acid soap-containing oily residues obtained in the distillation of acid-containing mineral oils over alkalies or alkaline earths consisting in treating said residues in the water-free state with concentrated sulphuric acid mechanically separating the resin-like products formed and filtering the oily liquid which remains over fuller's earth so that a mineral-oil-like product of high naphthenic acid content is obtained.

4. A process for working up the naphthenic acid soap-containing oily residues obtained in the distillation of acid-containing mineral oils over alkalies or alkaline earths consisting in treating said residues in the water-free state with concentrated sulphuric acid at ordinary temperature, mechanically separating the resin-like products formed and filtering the oily liquid which remains over fuller's earth, so that a mineral-oil-like product of high naphthenic acid content is obtained.

5. A process for working up the naphthenic acid soap-containing oily residues obtained in the distillation of acid-containing mineral oils over alkalies or alkaline earths consisting in mixing the distillation residues in the water-free state with concentrated sulphuric acid; mechanically separating the resin-like products formed, and filtering the oily liquid which remains over fuller's earth so as to obtain a mineral-oil-like product of high naphthenic acid content.

6. A process for working up the naphthenic acid soap-containing oily residues obtained in the distillation of acid-containing mineral oils over alkalies or alkaline earths consisting in mixing the distillation residues in the water-free state with 4% of concentrated sulphuric acid; mechanically separately the resin-like products formed and filtering the oily liquid which remains over fuller's earth so as to obtain a mineral-oil-like product of high naphthenic acid content.

RICHARD BRUNCK.
ALFRED KREUTZER.
WALTHER BOECK.